United States Patent
Sugaya

(10) Patent No.: US 10,345,687 B2
(45) Date of Patent: Jul. 9, 2019

(54) PROJECTION SYSTEM, PROJECTION METHOD, AND PROJECTION PROGRAM

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/526,442

(22) PCT Filed: Jul. 27, 2016

(86) PCT No.: PCT/JP2016/072020
§ 371 (c)(1),
(2) Date: Feb. 1, 2018

(87) PCT Pub. No.: WO2018/020606
PCT Pub. Date: Feb. 1, 2018

(65) Prior Publication Data
US 2019/0137854 A1  May 9, 2019

(51) Int. Cl.
| | | |
|---|---|---|
| G03B 21/14 | (2006.01) | |
| H04N 9/31 | (2006.01) | |
| G06F 3/0484 | (2013.01) | |
| G02B 27/00 | (2006.01) | |
| G06T 7/50 | (2017.01) | |

(52) U.S. Cl.
CPC ....... *G03B 21/147* (2013.01); *G02B 27/0043* (2013.01); *G06F 3/0484* (2013.01); *G06T 7/50* (2017.01); *H04N 9/3182* (2013.01); *H04N 9/3185* (2013.01)

(58) Field of Classification Search
CPC ........ G03B 21/147; G03B 21/14; G06T 7/50; G06F 3/0484; H04N 9/3194; H04N 9/3182; H04N 9/31285
See application file for complete search history.

(56) References Cited

U.S. PATENT DOCUMENTS 6,416,186 B1   7/2002  Nakamura
2009/0310100 A1  12/2009  Kondo

FOREIGN PATENT DOCUMENTS

| JP | 2001-061121 | 3/2001 |
| JP | 2008-294961 | 12/2008 |
| JP | 2009-049007 | 3/2009 |
| JP | 2010-250560 | 11/2010 |
| JP | 2014-233056 | 12/2014 |
| JP | 3199779 | 9/2015 |
| WO | 2007/072695 | 6/2007 |

*Primary Examiner* — Ryan D Howard
(74) *Attorney, Agent, or Firm* — Lex IP Meister, PLLC

(57) ABSTRACT

The present invention is to provide a projection system, a projection method, and a projection program that improve the convenience. The projection system 1 that corrects an image to be projected on a projection surface images the projection surface, detects the shape of an object existing on the imaged projection surface by image analysis, corrects an image to be projected so as to eliminate the shape of the detected object, and projects the corrected image on the projection surface.

4 Claims, 7 Drawing Sheets

PROJECTION SYSTEM, PROJECTION METHOD, AND PROJECTION PROGRAM

TECHNICAL FIELD

The present invention relates to a projection system, a projection method, and a projection program that project images on a projection surface.

BACKGROUND ART

Recently, projection devices such as projectors that project images on the projection surfaces of walls and screens have been widespread. Such projection devices also project images on the surface of other things than screens. For example, projection devices project images on the projection surfaces of ceilings, walls, and floors.

Among such projection devices, the projection device that projects suitable images on a projection surface by receiving the input that changes image shape data to be projected according to the unevenness of the projection surface (see Patent Document 1).

CITATION LIST

Patent Literature

Patent Document 1: JP 2014-233056 A

SUMMARY OF INVENTION

However, the projection device of Patent Document 1 requires the user to input image shape data. Thus, there is a problem in that the projection device hardly projects suitable images on uneven projection surfaces and distorts images on a distorted projection surface with an object. This problem hampers the convenience.

An objective of the present invention is to provide a projection system, a projection method, and a projection program that improve the convenience.

The first aspect of the present invention provides a projection system that corrects an image to be projected on a projection surface, including:

an imaging unit that images the projection surface;

a shape detection unit that detects the shape of an object existing on the imaged projection surface by image analysis;

an image correction unit that corrects an image to be projected so as to eliminate the shape of the detected object; and a projection unit that projects the corrected image on the projection surface.

According to the first aspect of the present invention, a projection system that corrects an image to be projected on a projection surface images the projection surface, detects the shape of an object existing on the imaged projection surface by image analysis, corrects an image to be projected so as to eliminate the shape of the detected object, and projects the corrected image on the projection surface.

The first aspect of the present invention is the category of a projection system, but the category of a projection method or a projection program has similar functions and effects.

The second aspect of the present invention provides the projection system according to the first aspect of the present invention, further including a color detection unit that detects the color of an object existing on the imaged projection surface by image analysis, in which the image correction unit corrects an image to be projected so as to eliminate the shape and the color of the detected object.

According to the second aspect of the present invention, the projection system according to the first aspect of the present invention detects the color of an object existing on the imaged projection surface by image analysis and corrects an image to be projected so as to eliminate the shape and the color of the detected object.

The third aspect of the present invention provides the projection system according to the second aspect of the present invention, in which, when the object is an illuminant, the image correction unit corrects an image based on the luminous intensity.

According to the third aspect of the present invention, the projection system according to the second aspect of the present invention, when the object is an illuminant, corrects an image based on the luminous intensity.

The fourth aspect of the present invention provides the projection system according to the first aspect of the present invention, further including: a connection unit that, when the object is a device, connects with the device; and a power-off unit that powers off the device.

According to the fourth aspect of the present invention, the projection system according to the first aspect of the present invention, when the object is a device, connects with the device and powers off the device.

The fifth aspect of the present invention provides a projection method that corrects an image to be projected on a projection surface, including the steps of:

imaging the projection surface;

detecting the shape of an object existing on the imaged projection surface by image analysis;

correcting an image to be projected so as to eliminate the shape of the detected object; and projecting the corrected image on the projection surface.

The sixth aspect of the present invention provides a computer program product for use in a projection system that corrects an image to be projected on a projection surface, including a non-transitory computer usable medium having a set of instructions physically embodied therein, the set of instructions including computer readable program code, which when executed by the system causes the information processing unit to:

image the projection surface;

detect the shape of an object existing on the imaged projection surface by image analysis;

correct an image to be projected so as to eliminate the shape of the detected object; and project the corrected image on the projection surface.

The present invention can provide a projection system, a projection method, and a projection program that improve the convenience.

DESCRIPTION OF EMBODIMENTS

Embodiments of the present invention will be described below with reference to the attached drawings. However, these are illustrative only, and the technological scope of the present invention is not limited thereto.

Overview of Project System 1

Figure 1:
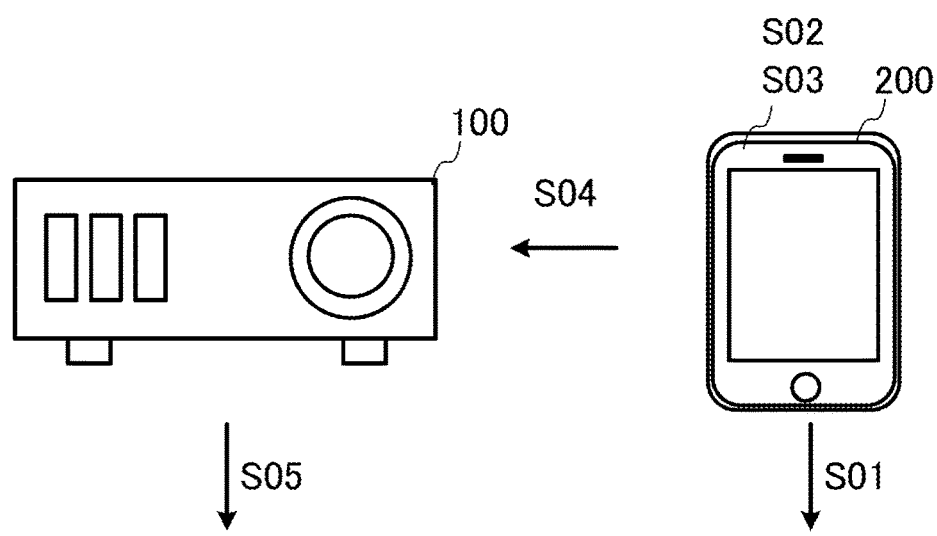
FIG. 1 shows a schematic diagram of the projection system 1.

A preferable embodiment of the present invention will be described below with reference to FIG. 1. FIG. 1 shows an overview of the project system 1 according to a preferable embodiment of the present invention. The projection system 1 includes a projection device 100 and a user terminal 200. In FIG. 1, the numbers of the projection devices 100 and the user terminals 200 are not limited to one and may be two or more. The process to be described later may be achieved by either or both of the projection device 100 and the user terminal 200.

The projection device 100 is capable of data communication with the user terminal 200, which is a projection instrument such as a projector that is capable to project images on the projection surfaces of ceilings, walls, screens, etc.

The user terminal 200 is capable of data communication with the projection device 100, which is a terminal device owned by a user. Examples of the user terminal 200 include electrical appliances such as a mobile phone, a mobile information terminal, a tablet terminal, a personal computer, a net book terminal, a slate terminal, an electronic book terminal, and a portable music player, and wearable terminals such as smart glasses and a head mounted display.

First, the user terminal 200 images a projection surface with an imaging device such as its own camera (Step S01).

The user terminal 200 detects the shape of an object existing on the projection surface by image analysis (Step S02). The user terminal 200 extracts the feature amount of the image and judges whether or not an object exists on the wall. If an object exists, the user terminal 200 detects the shape of this object. Examples of the object include a light, an air conditioner, a ventilator, a piece of furniture, and a beam. If the object is an illuminant such as a light, the user terminal 200 may detect the luminous intensity. Furthermore, if the object is a device such as an air conditioner or a ventilator, the user terminal 200 may start wired or wireless connection with this device and power it off.

The user terminal 200 corrects an image to be projected so as to eliminate the shape of the detected object (Step S03). The user terminal 200 performs various corrections such as geometrical correction and distortion correction for data on an image to be projected and eliminates the shape of the object to prevent the image from being distorted. The user terminal 200 may correct an image to be projected so as to eliminate the color of the detected object in addition to the shape. Furthermore, if the object is an illuminant, the projection device 100 may correct an image based on the detected luminous intensity as well as the shape.

The user terminal 200 transmits data on the corrected image to the projection device 100 (Step S04).

The projection device 100 receives the image data and projects the corrected image on the projection surface based on the image data (Step S05).

According to the above-mentioned configuration, the projection system 1 images a projection surface, detects the shape of an object existing on the imaged projection surface by image analysis, corrects an image to be projected so as to eliminate the shape of the detected object, and projects the corrected image on the projection surface, so as to prevent an image to be projected from being distorted if an object exists on the projection surface.

System Configuration of Projection System 1

Figure 2:
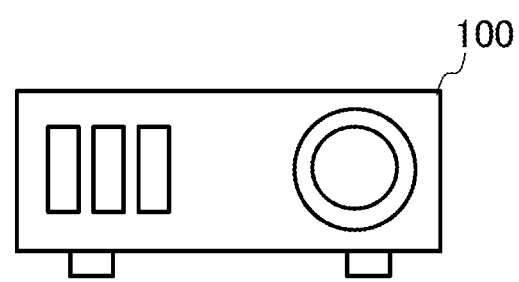
FIG. 2 shows an overall configuration diagram of the projection system 1.
Figure 2:
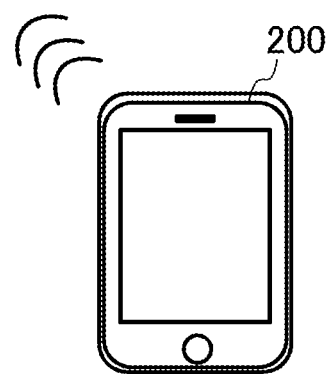

A system configuration of the projection system 1 according to a preferable embodiment will be described below with reference to FIG. 2. FIG. 2 shows a block diagram illustrating the projection system 1 according to a preferable embodiment of the present invention. The projection system 1 includes a projection device 100 and a user terminal 200. The numbers of the projection devices 100 and the user terminals 200 are not limited to one and may be two or more. The process to be described later may be achieved by either or both of the projection device 100 and the user terminal 200.

The projection device 100 is the above-mentioned projection instrument with the functions to be described later.

The user terminal 200 is the above-mentioned terminal device with the functions to be described later.

Functions

Figure 3:
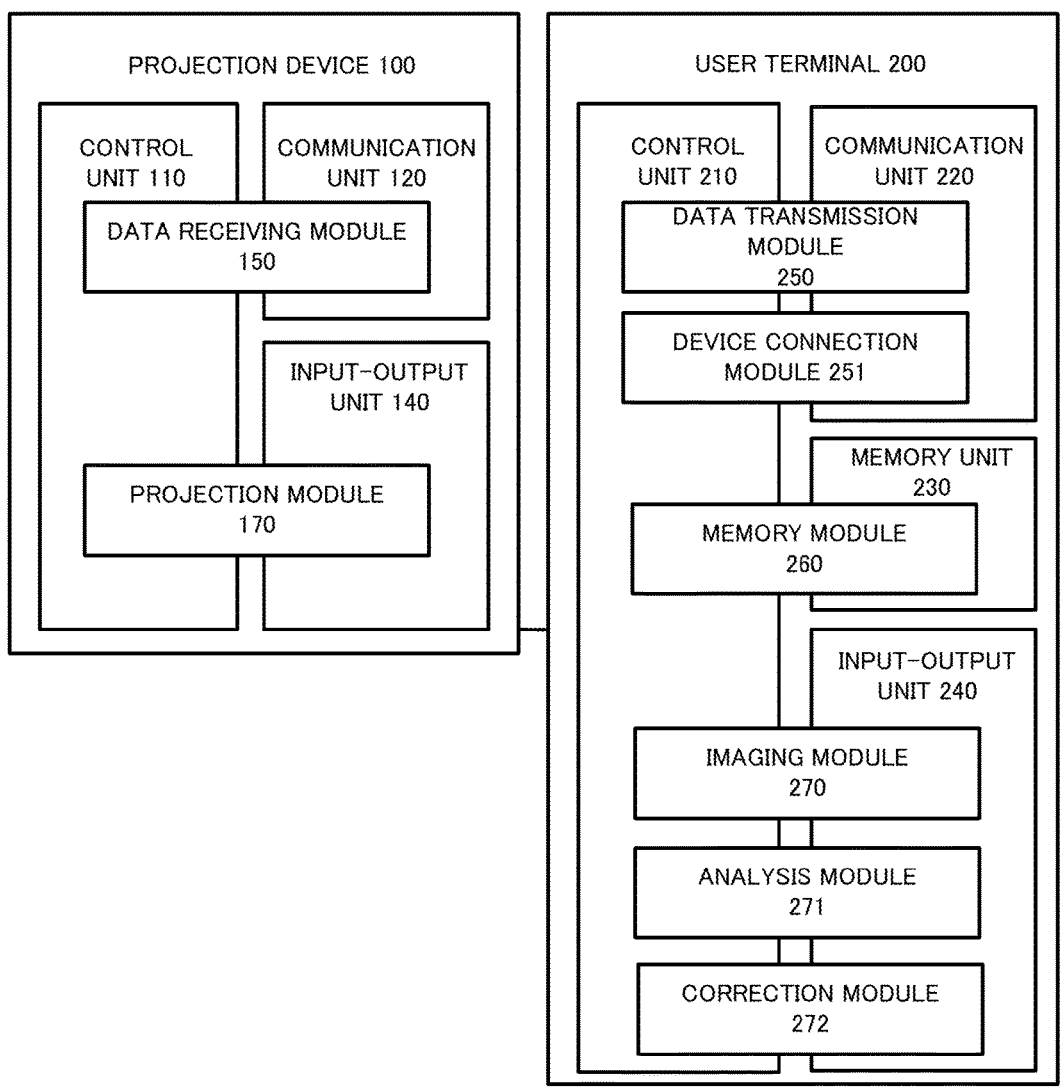
FIG. 3 shows a functional block diagram of the projection device 100 and the user terminal 200.

Functions of the projection system 1 according to a preferable embodiment will be described below with reference to FIG. 3. FIG. 3 shows a functional block diagram of the projection device 100 and the user terminal 200.

The projection terminal 100 includes a control unit 110 provided with a central processing unit (hereinafter referred to as "CPU"), a random access memory (hereinafter referred to as "RAM"), a read only memory (hereinafter referred to as "ROM"), etc.; and a communication unit 120 such as a device that is capable to communicate with other devices, for example, a Wireless Fidelity or Wi-Fi® enabled device complying with IEEE 802.11. The projection terminal 100 also includes an input-output unit 140 including a display unit that outputs and displays data and images that have been processed by the control unit 110; an input unit such as a touch panel or a switch that receives an input from the user; and a projection device that projects images on the projection surface.

In the projection terminal 100, the control unit 110 reads a predetermined program to achieve a data receiving module 150 in cooperation with the communication unit 120. Furthermore, in the projection terminal 100, the control unit 110 reads a predetermined program to achieve a projection module 170 in cooperation with the input-output unit 140.

In the same way as the projection unit 100, the user terminal 200 includes a control unit 210 provided with a CPU, a RAM, a ROM, etc., a communication unit 220 such as a device that is capable to communicate with other devices, and an input-output unit 240 including a display unit, an input unit, an imaging device provided with a lens and an imaging element, an analysis device that analyzes imaged images, and a correction device that corrects image data. The user terminal 200 also includes a memory unit 230 such as a hard disk, a semiconductor memory, a recording medium, or a memory card to store data. The memory unit 230 stores image data to be projected by a projection device 100 to be described later.

In the user terminal 200, the control unit 210 reads a predetermined program to achieve a data transmission module 250 and a device connection module 251 in cooperation with the communication unit 220. In the user terminal 200, the control unit 210 reads a predetermined program to achieve a memory module 260 in cooperation with the memory unit 230. Furthermore, in the user terminal 200, the control unit 210 reads a predetermined program to achieve an imaging module 270, an analysis module 271, and a correction module 272 in cooperation with the input-output unit 240.

Projection Process

Figure 4:
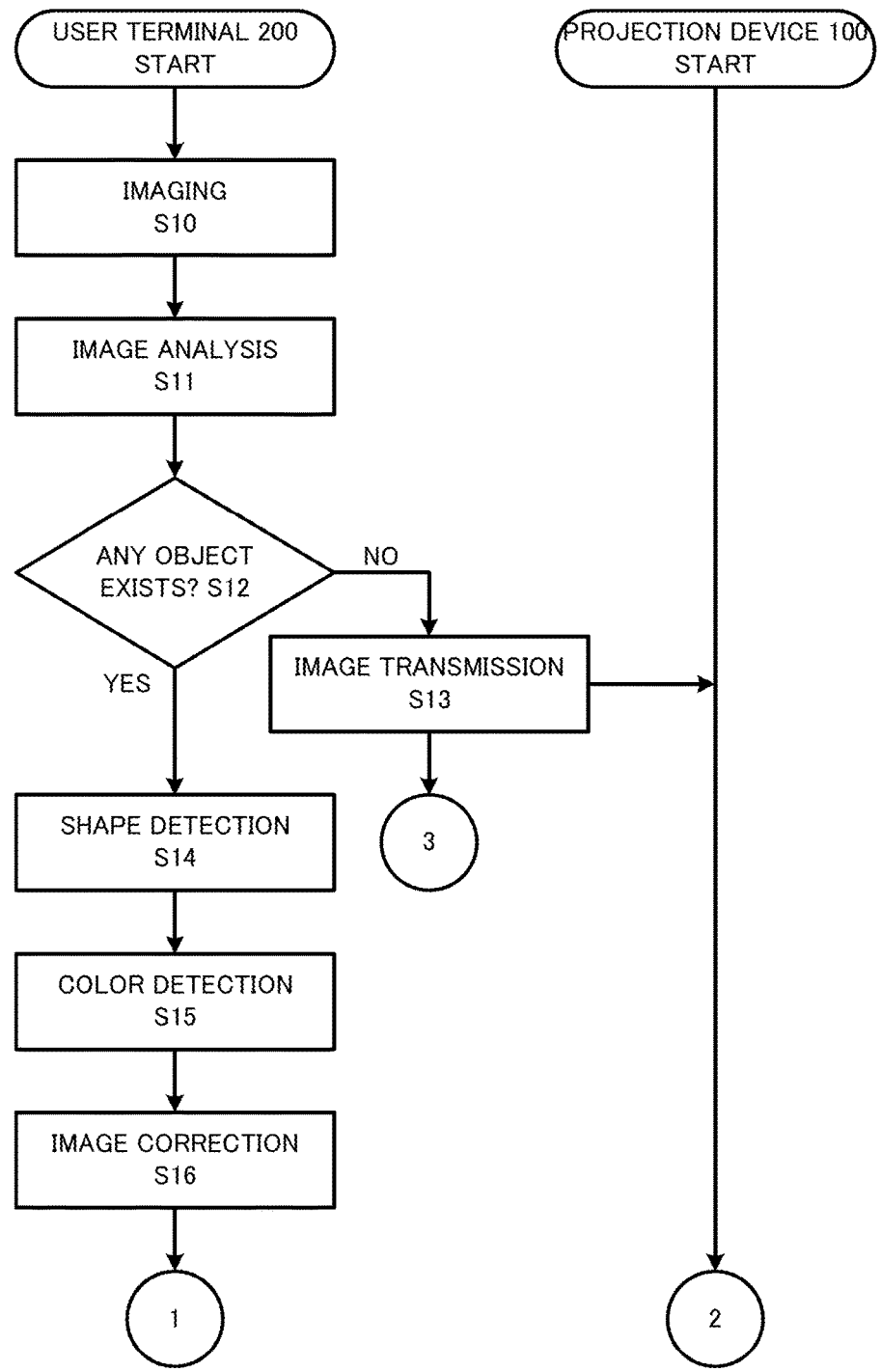
FIGS. 4 and 5 show a flow chart illustrating the projection process performed by the projection device 100 and the user terminal 200.
Figure 5:
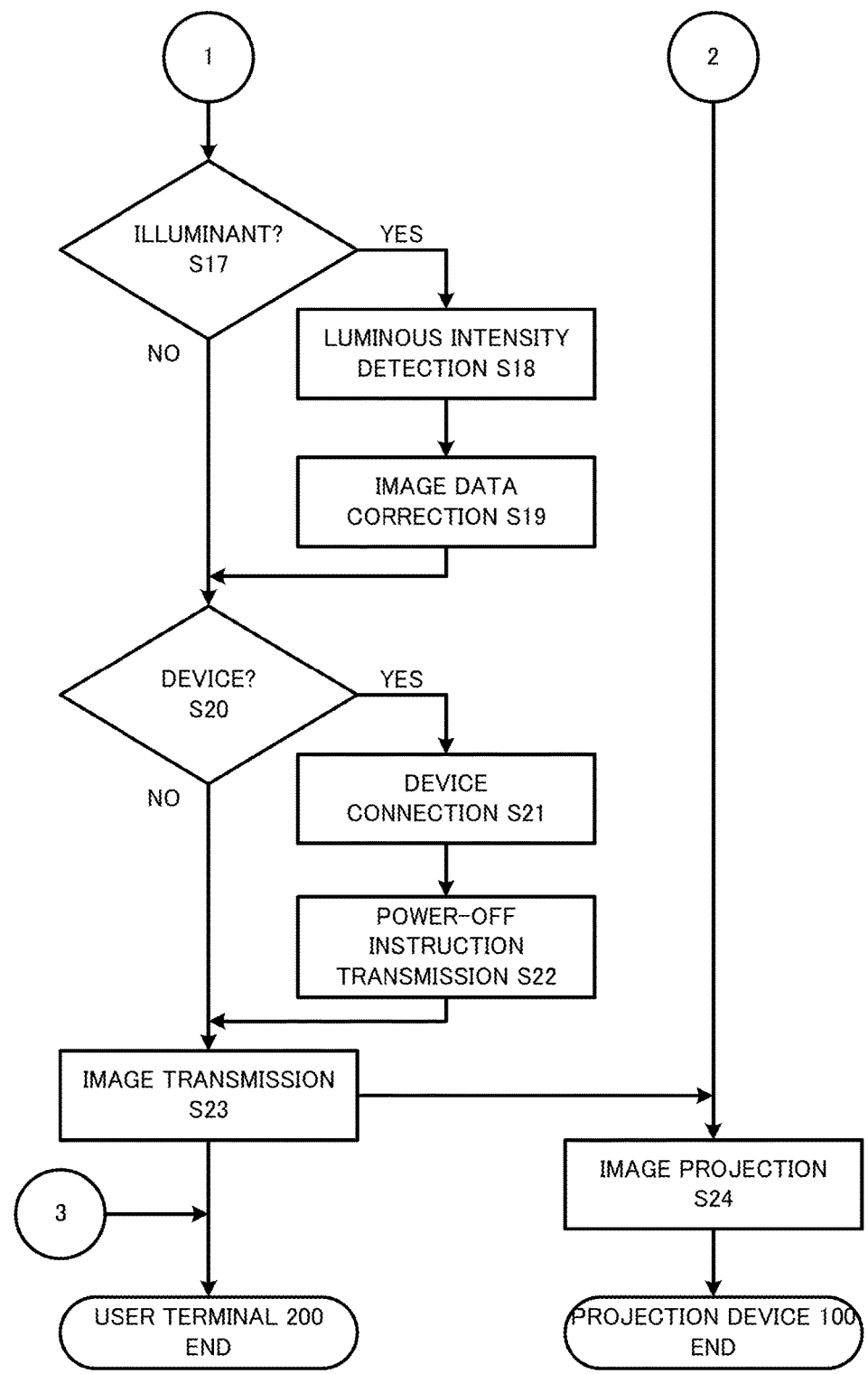

The projection process performed by the projection system 1 will be described below with reference to FIGS. 4 and 5. FIGS. 4 and 5 show a flow chart illustrating the projection process performed by the projection device 100 and the user terminal 200. The tasks executed by the modules of each of the above-mentioned devices will be explained below together with this process.

The imaging module 270 images a projection surface (Step S10). In this embodiment, the imaging module 270 images a ceiling. However, the projection surface imaged by the imaging module 270 is not limited to a ceiling and may be a wall, a floor, a screen, or the like.

The analysis module 271 analyzes the imaged image (Step S11). The analysis module 271 determines the presence or absence of the object, the luminance, etc., by analyzing the feature amount, the color, etc., of the image.

Figure 6:
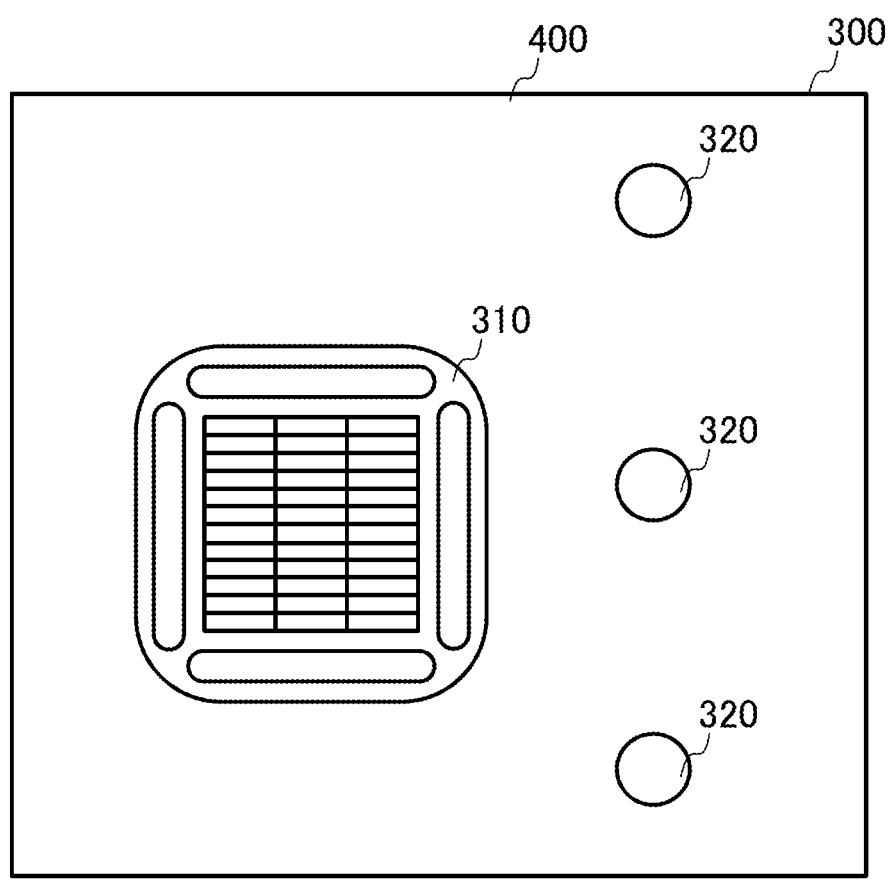
FIG. 6 shows an example of the image 300 based on a result of the image analysis performed by the user terminal 200.

FIG. 6 shows an example of the image based on a result of the image analysis performed by the analysis module 271. The analysis module 271 recognizes a projection surface 400, a device 310, and an illuminant 320 based on the result of analysis of the image 300. In FIG. 6, the analysis module 271 recognizes one device 310 and three illuminants 320 that exist on a projection surface 400. In FIG. 6, the device 310 is an air conditioner, and the illuminants 320 are lights. The analysis module 271 recognizes the shapes of the device 310 and the illuminants 320 by extracting the feature amount of the image 300. The analysis module 271 also recognizes the colors of the device 310 and the illuminants 320 by extracting the RGB values. The RGB values of the device 310 represent the color, etc., of the device 310. The RGB values of the illuminants 320 present the luminous intensity, the luminescent color, the color, etc., of the each illuminant 320.

The analysis module 271 judges whether or not an object exists on the projection surface based on the result of the image analysis (Step S12). In the step S12, the analysis module 271 judges whether or not an object such a device 310 or an illuminant 320 as described above exists on the projection surface. If the analysis module 271 judges that no objects exist (NO) in the step S12, the data transmission module 250 transmits image data stored in the memory module 260 to the projection device 100 (Step S13). In the step S13, the data transmission module 250 transmits the image data without correction. After the step S13, the user terminal 200 ends this process, and the projection device 100 performs the step S24 to be described later.

If judging that an object exists (YES) in the step S12, the analysis module 271 detects the shape of this object (Step S14). In the step S14, the analysis module 271 detects the shape of the object by performing pattern recognition, edge extraction, etc.

The analysis module 271 detects the color of the object (Step S15). The analysis module 271 detects the color of the object by detecting the color code, the RGB values, etc., of the object.

The correction module 272 corrects the image data stored in the memory module 260 based on the shape and the color of the detected object (Step S16). In the step S16, the correction module 272 corrects the image data so as to eliminate the shape and the color of the detected object. For example, if an irregularity exists in the shape of the object, the correction module 272 corrects the image data so as to eliminate the shape of the object by correcting the distortion and the pixel values. The correction module 272 also corrects the RGB values of the image data by calculating the correction data that eliminate the colors of the object and the projection surface based on the RGB values of the object and the projection surface and based on the color data for the ideal projection surface previously stored in the memory module 260. The correction module 272 also corrects the image data by putting colors so as to eliminate the colors of the object and the projection surface.

The correction module 272 may correct either the shape or the color of the object. Furthermore, the correction module 272 may perform corrections other than those mentioned above.

Still furthermore, the correction module 272 may correct image data other than those stored in the memory module 260. For example, the correction module 272 may correct image data stored in an external computer and a cloud that are not shown in the attached drawings. This configuration is the same even if image data is corrected in the steps to be described later.

The analysis module 271 judges whether or not the detected object is an illuminant such as a light (Step S17). In the step S17, based on the result of the image analysis, the analysis module 271 judges, for example, whether or not the luminance of the object is more than a predetermined value, whether or not the object has a predetermined shape, and whether or not the object has a predetermined color.

If judging that the detected object is not an illuminant (NO) in the step S17, the analysis module 271 performs the step S20 to be described later.

On the other hand, if judging that the detected object is an illuminant (YES) in the step S17, the analysis module 271 detects the luminous intensity of the object (Step S18). For example, the analysis module 271 detects the luminous intensity of the illuminant by detecting the RGB values and the luminous intensity of the illuminant.

The correction module 272 corrects the image data stored in the memory module 260 based on the luminous intensity of the detected object (Step S19). In the step S19, the correction module 272 corrects the image data so as to eliminate the luminous intensity of the detected object. For example, the correction module 272 corrects the RGB values of the image data to correct the RGB values of the image data corrupted by the illuminant to the original values based on the RGB values of the detected illuminant. The correction module 272 also corrects the luminance difference between the illuminant and the projection surface. The correction module 272 also corrects the image data according to the luminous intensity around the illuminant and the eye adjustment.

The correction module 272 may perform corrections other than those mentioned above.

The analysis module 271 judges whether or not the detected object is a device such as an electric appliance (Step S20). In the step S20, the analysis module 271 judges whether or not the object has a predetermined shape.

If judging that the detected object is not a device (NO) in the step S20, the analysis module 271 performs the step S23 to be described later.

On the other hand, if the analysis module 271 judges that the detected object is a device (YES) in the step S20, the device connection module 251 connects with this device (Step S21). In the step S21, for example, the device connection module 251 performs radiocommunication with this device to power ON/OFF and perform other controls. In the step S21, for example, the device connection module 251 identifies the identifier and the type specific to the detected device from those of the devices stored in the memory module 260 and acquires the information necessary to connect with the detected device from the information previously stored in the memory module 260 or the external database. The device connection module 251 connects with the detected device based on the acquired information.

The device connection module 251 transmits an instruction to power off the device with which the device connection module 251 is connecting. (Step S22). The device receives this instruction and powers off itself based on this instruction.

The device connection module 251 may vary the instruction with device. For example, if the device is an air conditioning device such as an air conditioner, powering it off by the device connection module 251 may make the user uncomfortable. In this case, the device connection module 251 may transmit an instruction to reduce the noise, for example, by decreasing the air volume and fixing the air direction instead of to power it off. Furthermore, if the device is a light device with a dimming function and a color adjustment function, the device connection module 251 may transmit an instruction, for example, to power off the device or to reduce the luminance or the illuminance. In other words, the user terminal 200 may transmit a different instruction based on the type, the function, etc., of the device.

The data transmission module 250 transmits the corrected image data to the projection device 100 (Step S23). In the step S23, the data transmission module 250 transmits the image data corrected by the above-mentioned steps.

The data receiving module 150 receives image data. The projection module 170 projects the image on the projection surface based on the uncorrected image data that the data receiving module 150 has received in the above-mentioned step S13 or based on the corrected image data that the data receiving module 150 has received in the above-mentioned step S23 (Step S24).

Figure 7:
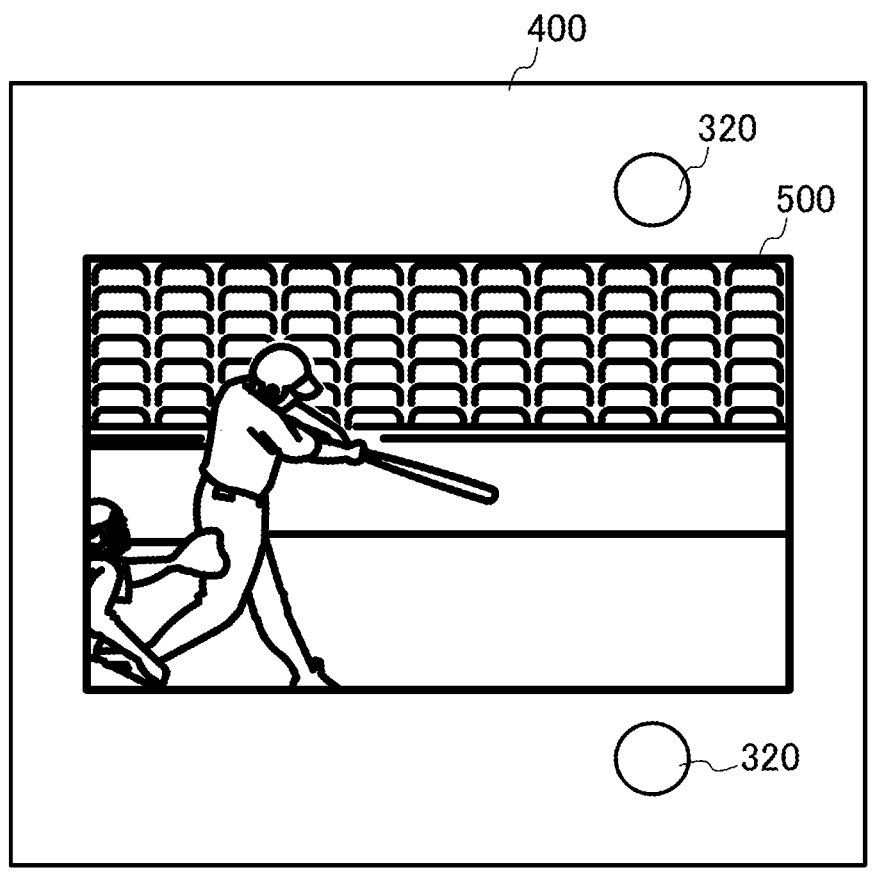
FIG. 7 shows an example where the projection device 100 is projecting an image 500 on a projection surface 400.

FIG. 7 shows an example where the projection module 170 is projecting an image 500 on a projection surface 400. In FIG. 7, the projection module 170 projects an image 500 on the recognized projection surface 400 shown in FIG. 6 as described above. The projection module 170 also projects the image 500 that has been corrected so as to eliminate the shape and the color of the device 310 and the shape, the color, and the luminous intensity of the illuminant 320, on the projection surface 400. In FIG. 7, the projection module 170 projects an image 500 so that the shape and the color of the device 310 do not disturb the user. Furthermore, the projection module 170 projects an image 500 so that the shape, the color, and the luminance of the illuminant 320 do not disturb the user.

According to the above-mentioned projection process, the projection system 1 can detect an object on the projection surface, correct an image to be projected so as to eliminate the shape of the object, and project the image. Furthermore, the projection system 1 can correct an image to be projected so as to eliminate the color of the object. Still furthermore, if the object is a device, the projection system 1 can connect with the device and power it off.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST 1 projection system
100 projection device
200 user terminal

What is claimed is:

1. A projection system that corrects an image to be projected on a projection surface, comprising:
   an imaging unit that images the projection surface;
   a shape detection unit that detects the shape of an object existing on the imaged projection surface by image analysis;
   an image correction unit that corrects an image to be projected so as to eliminate the shape of the detected object;
   a projection unit that projects the corrected image on the projection surface; and
   a color detection unit that detects the color of an object existing on the imaged projection surface by image analysis,
   wherein the image correction unit corrects an image to be projected so as to eliminate the shape and the color of the detected object, and
   wherein, when the object is an illuminant, the image correction unit corrects an image based on the luminous intensity.

2. The projection system according to claim 1, further comprising: a connection unit that, when the object is a device, connects with the device; and a power-off unit that powers off the device.

3. A projection method that corrects an image to be projected on a projection surface, comprising the steps of:
   imaging the projection surface;
   detecting the shape of an object existing on the imaged projection surface by image analysis;
   correcting an image to be projected so as to eliminate the shape of the detected object;
   detecting the color of an object existing on the imaged projection surface by image analysis;
   correcting the image to be projected so as to eliminate the shape and the color of the detected object; and
   projecting the corrected image on the projection surface,
   wherein, when the object is an illuminant, the image is corrected based on the luminous intensity.

4. A computer program product for use in a projection system that corrects an image to be projected on a projection surface, comprising a non-transitory computer usable medium having a set of instructions physically embodied therein, the set of instructions including computer readable program code, which when executed by the system causes the information processing unit to:
   image the projection surface;
   detect the shape of an object existing on the imaged projection surface by image analysis;

correct an image to be projected so as to eliminate the shape of the detected object;
detect the color of an object existing on the imaged projection surface by image analysis;
correct the image to be projected so as to eliminate the shape and the color of the detected object; and
project the corrected image on the projection surface,
wherein, when the object is an illuminant, the image is corrected based on the luminous intensity.

* * * * *